(12) United States Patent
Imada

(10) Patent No.: US 7,414,648 B2
(45) Date of Patent: Aug. 19, 2008

(54) CAMERA AND CAMERA SYSTEM CAPABLE OF CHANGING GAIN VALUE AND EXPOSURE TIME

(75) Inventor: Shinji Imada, Tokoyo (JP)

(73) Assignee: Canon Kabushiki Kaisha, Tokyo (JP)

(*) Notice: Subject to any disclaimer, the term of this patent is extended or adjusted under 35 U.S.C. 154(b) by 773 days.

(21) Appl. No.: 10/664,505

(22) Filed: Sep. 16, 2003

(65) Prior Publication Data
US 2004/0090532 A1    May 13, 2004

(30) Foreign Application Priority Data
Sep. 20, 2002    (JP)    ............. 2002-276359

(51) Int. Cl.
H04N 5/228    (2006.01)
H04N 5/235    (2006.01)
H04N 5/238    (2006.01)

(52) U.S. Cl. .............. 348/208.12; 348/229.1; 348/366

(58) Field of Classification Search .......... 348/229.1, 348/208.16, 208.12, 239, 208.4, 238, 208.2, 348/234, 237, 208.5, 208.7, 208.8, 208.11, 348/208.99, 362, 366
See application file for complete search history.

(56) References Cited

U.S. PATENT DOCUMENTS

| | | | | |
|---|---|---|---|---|
| 5,382,974 A | * | 1/1995 | Soeda et al. | 348/221.1 |
| 5,502,484 A | * | 3/1996 | Okada | 348/208.6 |
| 5,585,875 A | * | 12/1996 | Imafuji et al. | 396/55 |
| 5,608,703 A | * | 3/1997 | Washisu | 348/208.7 |
| 6,091,448 A | * | 7/2000 | Washisu et al. | 348/208.16 |
| 6,181,875 B1 | * | 1/2001 | Hamada et al. | 396/55 |
| 6,246,437 B1 | * | 6/2001 | Kaneda | 348/333.03 |
| 6,272,289 B1 | * | 8/2001 | Washisu | 396/55 |
| 6,603,508 B1 | * | 8/2003 | Hata | 348/229.1 |
| 6,778,210 B1 | * | 8/2004 | Sugahara et al. | 348/208.4 |
| 6,816,188 B1 | * | 11/2004 | Imai | 348/208.2 |
| 6,930,708 B1 | * | 8/2005 | Sato et al. | 348/208.99 |
| 2002/0080247 A1 | * | 6/2002 | Takahashi et al. | 348/229 |
| 2002/0196347 A1 | * | 12/2002 | Ishikawa et al. | 348/208.5 |
| 2003/0133021 A1 | * | 7/2003 | Hamamura et al. | 348/229.1 |
| 2004/0201707 A1 | * | 10/2004 | Noguchi et al. | 348/208.7 |

FOREIGN PATENT DOCUMENTS

| | | |
|---|---|---|
| JP | 08-313955 | 11/1996 |
| JP | 09-043658 | 2/1997 |
| JP | 11-326980 | 11/1999 |
| JP | 2000-184273 | 6/2000 |

* cited by examiner

Primary Examiner—Justin P. Misleh
(74) Attorney, Agent, or Firm—Morgan & Finnegan, LLP

(57) ABSTRACT

An image-pickup apparatus which improves the S/N ratio of an image-pickup system, prevents image blur and saturation of signals from an image-pickup device, and enables taking an excellent image, is disclosed. The camera of the invention which takes images through an image-taking optical system having a shake correction unit which drives a part of an image-taking optical system to correct image blur caused by camera shake and includes an image-pickup device which photoelectrically converts an object image formed by the image-taking optical system and a control circuit which controls operations of the camera, wherein the control circuit changes the sensitivity and the exposure time of the image-pickup device whether the shake correction unit is in operation or not.

4 Claims, 9 Drawing Sheets

CAMERA AND CAMERA SYSTEM CAPABLE OF CHANGING GAIN VALUE AND EXPOSURE TIME

BACKGROUND OF THE INVENTION

1. Field of the Invention

The present invention relates to a digital still camera having an image blur correcting function.

2. Description of Related Art

In a silver-salt film camera, its image-taking sensitivity (ISO sensitivity) cannot be changed unless a loaded film is replaced, however, in a digital still camera, its image-taking sensitivity can be easily changed by changing the gain of signals from an image pickup device such as a CCD.

Therefore, an image-taking sensitivity suitable for image-taking conditions can be set by a camera operator or at the camera side. For example, when it is desired to reduce affects from image blur by increasing the shutter speed, the image-taking sensitivity is set to be higher in accordance with the shutter speed increase.

Furthermore, as an image blur prevention system, a system which optically prevents image blur by moving a part of the lenses of the image-taking optical system has been proposed.

Herein, an image blur prevention system is briefly described. Camera shake when taking an image is generally vibrations with frequencies of 1 to 12 Hz, and at the point of shutter releasing, in order to make it possible,to take a photograph without image blur even when such camera shake occurs, it is necessary that the abovementioned camera shake due to hand shake is detected and the correction lens is displaced in accordance with a detected value. Therefore, in order to make it possible to take a photograph without image blur even when camera shake occurs, first of all, accurate detection of camera shake becomes necessary, and second, a displacement of the optical axis of the camera due to the camera shake must be corrected.

This shake (camera shake) detection can be carried out, in principle, on the camera, by mounting a vibration sensor which detects the angular acceleration, the angular velocity, and angular displacement, etc., and a camera shake sensor which outputs angular displacement by electrically or mechanically integrating an output signal of this vibration sensor. Then, the correcting optical element which makes the image-taking optical axis eccentric is driven based on this detection information to carry out prevention of image blur.

A conventional camera vibration isolation system is proposed in Japanese Patent Application Laid-Open No. H9(1997)-43658. The outline of this is described with reference to FIG. 9. This vibration isolation system is a system which suppresses image blur caused by vertical shake $81p$ and horizontal shake $81y$ of the camera in the directions shown by the arrows $81$, and is provided at the interchangeable lens of a single-lens reflex camera.

In the same figure, the reference numeral $82$ denotes a lens barrel. Shake sensors $83p$ and $83y$ detect vertical shake and horizontal shake of the camera, respectively, and their shake detection directions are indicated by the reference numerals $84p$ and $84y$, respectively.

The reference numeral $85$ denotes a shake correcting optical unit. Coils $86p$ and $86y$ provide thrust for the shake correcting optical unit $85$, position sensors $87p$ and $87y$ detect the position of the shake correcting optical unit $85$. These coils $86p$ and $86y$ and position sensors $87p$ and $87y$ form a position control loop, and power is supplied to the coils $86p$ and $86y$ so that the positions detected by the position sensors $87p$ and $87y$ reach set target values based on the outputs of the shake sensors $83p$ and $83y$ to prevent image blur at the image plane $88$.

However, in a digital still camera, if the shutter speed is increased to prevent image blur and the image-taking sensitivity is raised, noise is also amplified, resulting in lowering in the S/N ratio of the image-taking system and deterioration of the image.

Furthermore, when an image blur correcting system is provided to prevent image blur, the shutter speed is lowered, and the image-taking sensitivity is set to be lower than a standard image-taking sensitivity to improve the S/N ratio, signals from the image pickup device for an object portion having a certain level of higher brightness become saturated, and there is a possibility that the image of this object portion is taken to be white (over exposure).

SUMMARY OF THE INVENTION

An object of the invention is to provide a camera and a camera system which improves the S/N ratio of the image-taking system, prevents image blur and saturation of signals from the image pickup device, and takes an excellent image.

In order to achieve the abovementioned object, one aspect of a camera of the invention which takes images through an image-taking optical system having a shake correction unit which corrects image blur caused by camera shake by driving a part of an image-taking optical system, comprises an image pickup device which photoelectrically converts an object image formed by the image-taking optical system, and a control circuit which controls operations of the camera. The control circuit changes the sensitivity and exposure time of the image pickup device whether the shake correction unit is in operation or not. Furthermore, the control circuit sets the sensitivity of the image pickup device to be lower and the exposure time of the image pickup device to be longer than when the shake correction unit is not in operation.

Furthermore, the camera system of the invention includes the camera and a lens apparatus to be attached to the camera.

The characteristics of the camera and camera system of the invention will be made clearer by the following detailed description of embodiments with reference to the accompanying drawings.

A detailed configuration of the camera and camera system of the invention, the above and other objects and features of the invention will be apparent from the embodiments, described below.

DETAILED DESCRIPTION OF THE PREFERRED EMBODIMENTS

Hereinafter, preferred embodiments of the invention will be described in detail with reference to the drawings.

Embodiment 1

Figure 1:
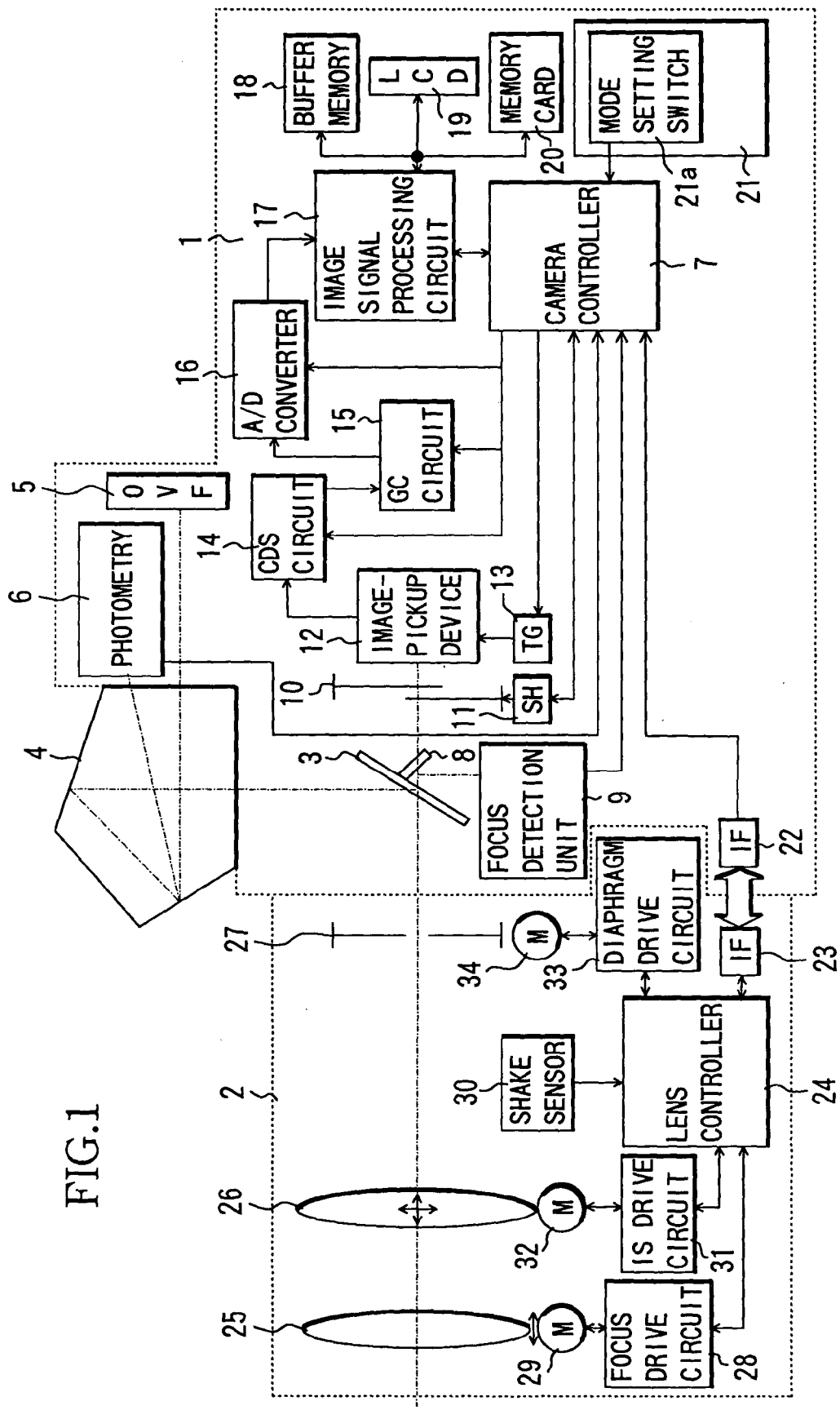
FIG. 1 is a block diagram showing the structure of a camera system of Embodiment 1.

FIG. 1 shows a camera system comprising a camera 1 which is a single-lens reflex digital still camera, and an interchangeable lens (lens apparatus) 2 which is attachable to the camera 1.

An image-taking light flux from an object passes through an image-taking optical system inside the interchangeable lens 2 and enters the inside of the camera 1. A part of this image-taking light flux is reflected by a quick-return main mirror 3 whose central portion is formed as a half mirror, and then the image thereof is formed on an unillustrated focusing plate. The object image formed on the focusing plate is converted to be an erect image by a pentaprism 4 and observed by a camera operator (not shown) through an optical finder 5.

In the camera 1, a photometric circuit 6 measures the luminance of the object image on the focusing plate and inputs the measurement results into a camera controller (control circuit) 7. A photometric sensor inside the photometric circuit 6 is divided into a plurality of areas, and the photometry results are obtained for each area.

Numerical reference 8 denotes a sub-mirror, which is disposed on the back surface of the quick-return main mirror 3. The sub-mirror 8 makes the light flux that has been transmitted through the half mirror surface incident onto a focus detection unit 9. The focus detection unit 9 detects phase deviations (that is, an amount of defocus of the image-taking optical system) of two images formed on a pair of CCD line sensors (not shown), and inputs the detection results into the camera controller 7. The focus detection unit 9 detects an amount of defocus of the image-taking optical system in a focus detection region automatically selected by a selecting operation of a camera operator or by the camera controller 7.

When the process enters an image-taking operation, the quick-return main mirror 3 and the sub-mirror 8 withdraw to the pentaprism 4 side, and the focal plane shutter 10 is driven by a shutter drive circuit 11. Thereby, the image of an image-taking light flux is formed on an image-pickup device 12 such as a CCD or a CMOS sensor, etc. The image-pickup device 12, and photoelectrically converts an optical image of an object and outputs image signals.

A timing generator 13 controls timings of charge storage operation, reading-out operation, and resetting operation, etc of the image-pickup device 12.

A Correlation Double Sampling circuit (hereinafter, referred to as CDS circuit) 14 lowers stored charge noise, and a gain control circuit 15 amplifies image signals, and an A/D converter 16 converts image signals amplified by the gain control circuit 15 from analog to digital to generate image data.

An image signal processing circuit 17 applies filtering, color conversion, and gamma correction to the image data digitized by the A/D converter 16. The image signals that have been subjected to signal processing are stored in a buffer memory 18, and displays as images on a liquid crystal display panel 19 or are recorded on a recording medium (semiconductor memory, magnetic disk, or optical disk, etc.) that is attachable to the camera 1.

An operation part 21 is provided with switches for setting the recording image file size and instructing image-taking preparation and the start of an image-taking operation in addition to a mode setting switch 21a for setting an image-taking mode in the camera 1.

The camera controller 7 controls the abovementioned operations in the camera 1. The camera controller 7 carries out mutual communications with a lens controller 24 via an interface circuit 22 of the camera 1 side and an interface circuit 23 of the interchangeable lens 2 side to transmit a focus driving command to the interchangeable lens 2 and transmit and receive data showing the operation status of the camera 1, the operation status of the interchangeable lens 2, and optical information.

The camera controller 7 also serves as a discrimination unit which discriminates a main object in an image-taking region.

The interchangeable lens 2 is provided with, a part of the image-taking optical system, an unillustrated zoom lens, a focusing lens 25, an image blur correcting lens 26, and a diaphragm 27.

The focusing lens 25 is driven in the direction of the optical axis by a focusing lens drive motor 29. The focusing lens drive motor 29 is controlled by a focus drive circuit 28 in response to a control signal from the lens controller 24. The focus drive circuit 28 includes a focusing encoder which outputs pulse signals in accordance with the movement of the focusing lens 25 in addition to a motor drive circuit.

The image blur correcting lens 26 is movable within plane orthogonal to the optical axis. A shake sensor 30 outputs a shake signal in accordance with the shake applied to the interchangeable lens 2. This shake signal is inputted into the lens controller 24, and based on the shake signal, the lens controller 24 generates a drive signal indicating a driving amount and a driving direction of the image blur correcting lens 26 for correcting image blur on the image-pickup device 12, and outputs it to an image stabilizer (hereinafter, abbreviated to IS) drive circuit 31. The IS drive circuit 31 processes to this drive signal and applies the signal to a linear motor 32 to drive the image blur correcting lens 26.

The interchangeable lens 2 is provided with a switch (not shown) for selecting on/off of the IS function.

The diaphragm 27 is driven by a diaphragm driving stepping motor 34, and the diaphragm driving stepping motor 34 is controlled by a diaphragm drive circuit 33 in response to a control signal from the lens controller 24.

Figure 2:
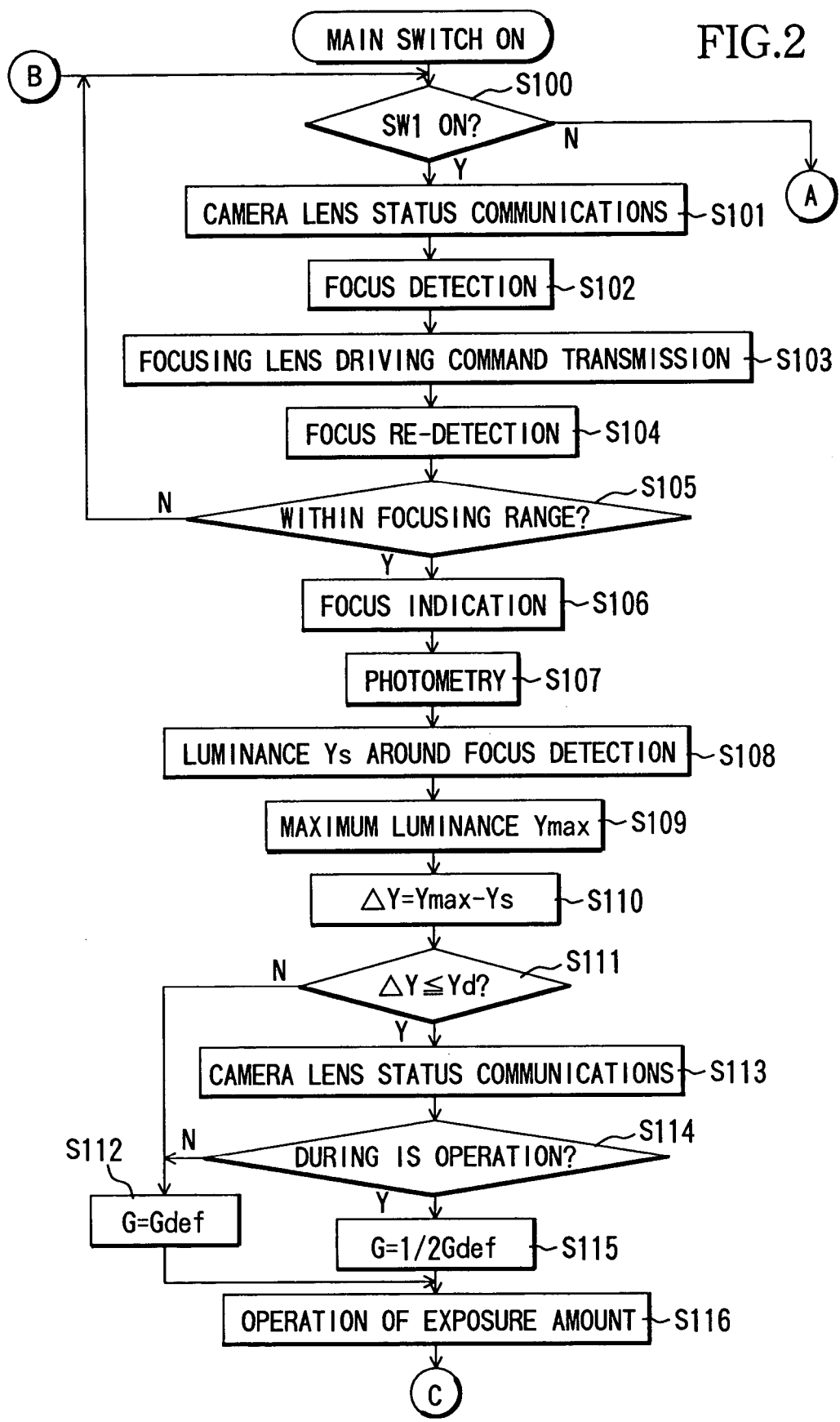
FIG. 2 is a flowchart showing operations of the camera side of Embodiment 1.
Figure 3:
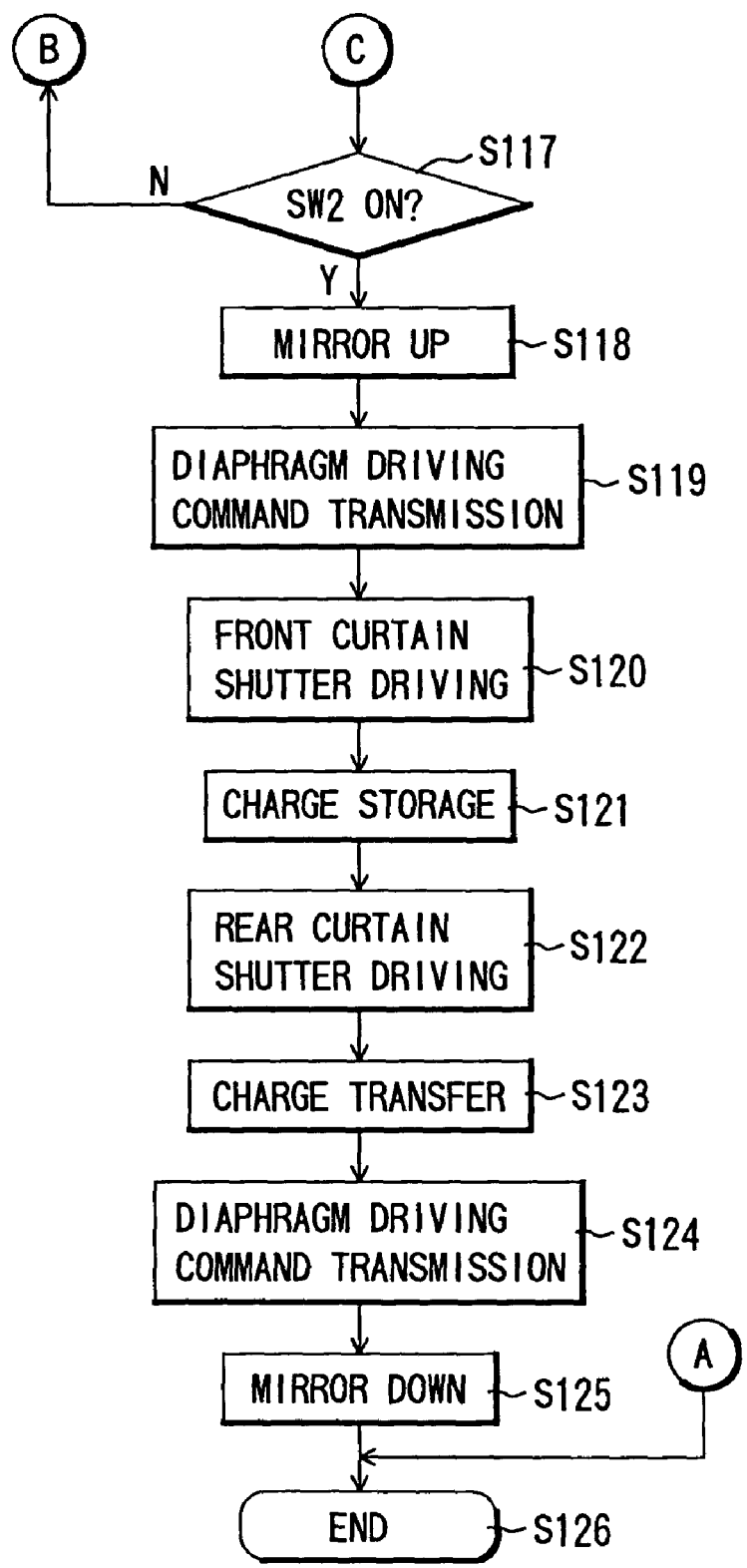
FIG. 3 is a flowchart showing operations of the camera side of Embodiment 1.

Next, operations of the camera 1 side (mainly, the camera controller 7) are described with reference to the flowcharts of FIG. 2 and FIG. 3. Portions of the same circled alphabetic letters in FIG. 2 and FIG. 3 are related to each other.

When an unillustrated main switch of the camera 1 side is turned on, the camera controller 7 starts its operation from Step (abbreviated to S in the figures) 100 after a predetermined initialization operation.

In Step 100, the camera controller 7 judges whether or not a release switch (not shown) provided at the operation part 21 has been half-depressed (switch 1 on). When half-depression is judged, the process progresses to Step 101, otherwise, the process progresses to Step 126 and ends the processing herein.

In Step 101, the camera controller 7 carries out mutual communications of the statuses of the camera 1 and the interchangeable lens 2 with the lens controller 24 via the interface circuits 22 and 23. Herein, information showing the status of the camera 1 (the status of the release switch (as to whether or not the switch 1 is on), image-taking mode, and shutter speed, etc.) is transmitted to the interchangeable lens 2, or information showing the status of the lens (IS on/off status, diaphragm status, and driving status of the focusing lens 25) is received. In the flowcharts of this embodiment, only main portions of the status communications are described, however, the communications are carried out whenever the state of the camera change and the camera requires confirmation of the status of the lens.

In Step 102, the camera controller 7 operates the focus detection unit 9 in accordance with half-depression (switch 1 is on) of the release switch, and calculates a driving amount of the focusing lens 25 for focusing on a certain object in a focus detection region based on a defocus amount detection signal from the focus detection unit 9 with respect to a focus detection region selected as mentioned above.

In Step 103, the camera controller 7 transmits information showing the focusing lens driving amount to the lens controller 24. This driving amount information is transmitted as, for example, a driving target pulse amount of the focusing encoder. Based on the received driving amount information, the lens controller 24 drives the focusing lens 25 via the focus drive circuit 28.

In Step 104, when the camera controller 7 receives information showing that driving of the focusing lens 25 has ended is received from the interchangeable lens 2 side, the focus detection unit 9 is operated again to detect an amount of defocus of the image-taking optical system.

In Step 105, the camera controller 7 judged whether or not the amount of defocus is within the focal depth, that is, within the focusing range, and if it is within the focusing range, the process progresses to Step 106.

In Step 106, since the amount of defocus is within the focal depth, the camera controller 7 carries out focus indication. This is carried by turning an LED on inside the optical finder 5 of the camera 1 or by sounding.

In Step 107, the camera controller 7 obtains photometry results (luminance) from the photometric circuit 6. Since the photometric sensor is divided into a plurality of areas mentioned above, luminance is obtained for each area.

In Step 108, the camera controller 7 obtains a luminance Ys of the photometric area including a focus detection region. Herein, a photometric area including the focus detection region can be regarded as including the existence of a main object to be shot by the camera operator. Therefore, herein, the illuminance Ys of the main object is obtained.

In Step 109, the camera controller 7 obtains a maximum luminance Ymax from the illuminance information from the respective photometric areas.

In Step 110, the camera controller 7 calculates the difference ΔY between the maximum luminance Ymax and the main object luminance Ys.

In Step 111, the camera controller 7 judges whether or not the luminance difference ΔY is a predetermined luminance Yd or less. If it is the predetermined luminance difference Yd or less, the process progresses to Step 113, and if it is greater than the predetermined luminance difference Yd, the process progresses to Step 112.

In Step 112, the camera controller 7 sets the gain value (amplification ratio) G of a gain control circuit 15 to a default value Gdef. Herein, the sensitivity of the image-pickup device 12 is determined by this gain value G and indicates the level of a signal to be finally outputted from the gain control circuit 15 with respect to the light amount that has been made incident on the image-pickup device 12.

In Step 113, the camera controller 7 carries out status communications with the interchangeable lens 2. Herein, the on/off status of the IS function in the interchangeable lens 2 is confirmed.

In Step 114, the camera controller 7 judges whether or not the IS function of the interchangeable lens 2 is on (in the middle of the shake correction operation) based on the status communications in Step 113. If it is not on, the process progresses to Step 113, otherwise, the process progresses to Step 115.

In Step 115, the camera controller 7 changes the gain value G of the gain control circuit 15 to ½ of the default value Gdef.

In Step 116, the camera controller 7 calculates an amount of exposure from the photometry results. Herein, an f-number and a shutter speed (that is, the exposure time of the image-pickup device 12) are determined from the photometry results and the gain value G. When the gain value G is set to be small (½ of Gdef) in Step 115, the shutter speed is set to be accordingly low (that is, set to be low so that a charge storage amount of the image-pickup device 12, nearly equal to that in the case where the gain value G is the default value Gdef, is obtained). When the shutter speed is lower than a predetermined speed, an unillustrated strobe may be made to emit, or the gain value G may be increased.

In Step 117, the camera controller 7 judges whether or not the release switch of the camera 1 has been fully depressed (switch 2 is on), and if it has been fully depressed, the process progresses to Step 118.

In Step 118, the camera controller 7 raises the quick-return main mirror 3. At this point, the sub-mirror 8 is also driven together with the main mirror 3 to the pentaprism 4 side.

In Step 119, the camera controller 7 transmits the diaphragm driving amount calculated in Step 116 to the interchangeable lens 2 to make the lens drive the diaphragm 27.

In Step 120, the camera controller 7 drives a front curtain of the shutter 10.

In Step 121, the camera controller 7 makes the image-pickup device 12 photoelectrically convert (expose) the object image and start charge storage.

In Step 122, after a period corresponding to the shutter speed calculated in Step 116 elapses, the camera controller 7 ends exposure by driving a rear curtain of the shutter 10.

In Step 123, the camera controller 7 transfers charges from the image-pickup device 12 to the CDS circuit 14. Image signals whose noise components have been eliminated in the CDS circuit 14 are amplified in accordance with the gain value G set by the gain control circuit 15, digitized into digital data by the A/D converter circuit 16, and transmitted to the image signal processing circuit 17.

In Step 124, the camera controller 7 transmits a diaphragm open command to the interchangeable lens 2 to return the condition of the diaphragm to be open.

In Step 125, the camera controller 7 moves down the quick-return main mirror 3 and the sub-mirror 8.

The operation of the camera 1 when the main switch is on is as mentioned above, and the abovementioned operation is repeated while the switch is on.

Figure 4:
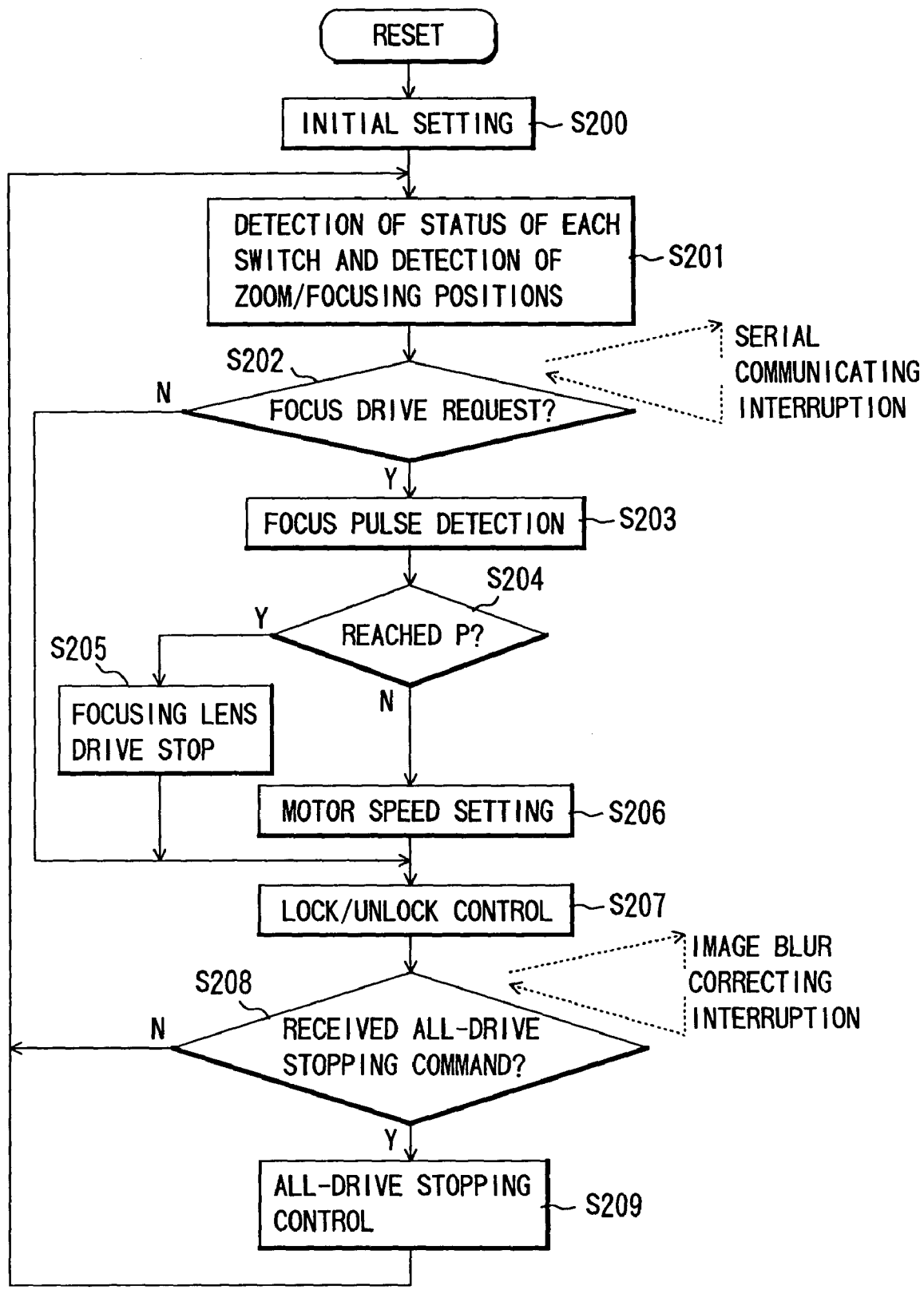
FIG. 4 is a flowchart showing operations of an interchangeable lens side of Embodiment 1.

Next, with reference to the flowchart of FIG. 4, operations of the interchangeable lens 2 side (mainly, operations of the lens controller 24) are described.

When the interchangeable lens 2 is mounted to the camera 1, serial communications are carried out from the camera 1 to the interchangeable lens 2, and the lens controller 24 starts its operation from Step 200 of FIG. 4.

In Step 200, the lens controller 24 carries out initial setting for lens controlling and IS controlling.

In Step 201, the lens controller 24 detects the statuses of unillustrated switches and detects the positions of the zoom lens and the focusing lens 25. The switches include a switch for changeover between auto-focusing and manual focusing, and an ON/OFF switch of the IS function. At this point, the detections are interrupted by serial communications from the camera 1, interruption processing is carried out.

In Step 202, the lens controller 24 judges whether or not communications have been carried out from the camera 1 to transmit a focus driving command. If a focus driving command has been received, the process progresses to Step 203, otherwise, the process progresses to Step 207.

In Step 203, the lens controller 24 also receives a target driving amount (pulse number) of the focusing lens 25 transmitted together with the focus driving command from the camera 1. Then, pulse signals from the focusing encoder of the focus drive circuit 28 are counted, the focus lens driving motor 29 is controlled so that this count value reaches the target driving amount pulse number, and the focusing lens 25 is driven.

In Step 204, the lens controller 24 judges whether or not the count value of pulse signals from the focusing encoder has reached the target driving amount pulse number P. If it has reached the target pulse number, the process progresses to Step 205, otherwise, the process progresses to Step 206.

In Step 205, the lens controller 24 stops driving of the focusing lens 25 (focusing lens driving motor 29) since the count value of pulse signals has reached the target pulse number.

In Step 206, since the count value of pulse signals has not reached the target pulse number, the lens controller 24 sets the speed of the focusing lens driving motor 29 in accordance with the remaining driving pulse number. Namely, as the remaining drive pulse number is reduced, the speed of the focusing lens driving motor 29 is reduced.

In Step 207, the lens controller 24 operates an unillustrated lock mechanism so as to lock the image blur correcting lens 26 at the center of the optical axis of the image-taking optical system when an off condition of the IS function ON/OFF switch is detected in Step 201. On the other hand, when an on conditions of the IS function ON/OFF switch is detected in Step 201, in accordance with detection of an on condition (switch 1 on) of the release switch of the camera through status communications from the camera 1, the abovementioned lock mechanism is unlocked, whereby driving of the image blur correcting lens 26 is enabled. At this time when an interruption of the image blur correction described later is generated, this interruption processing is carried out.

In Step 208, the lens controller 24 judges whether or not an all-drive stopping command (command to stop all drives of actuators inside the interchangeable lens 2) has been received from the camera 1. When no operation is carried out at the camera 1 side, after some time, this all-drive stopping command is transmitted from the camera 1. When the all-drive stopping command is received, the process progresses to Step 209, otherwise, the process returns to Step 201.

In Step 209, the lens controller 24 carries out all-drive stopping control. Herein, the drives of all actuators (29, 32, and 34, etc.) are stopped, and the lens controller 24 itself is turned to sleep (stopped). Furthermore, power supply to the IS drive circuit 31 is also stopped. Thereafter, when any operation is carried out at the camera 1 side, the camera 1 communicates with the interchangeable lens 2 to release the sleep condition.

Next, the abovementioned serial communicating interruption processing and the image blur correcting interruption processing are described.

In the serial communicating interruption processing, communications data from the camera 1 is decoded, and based on the decoding result, lens processing including diaphragm driving and focusing lens driving are carried out. Due to decoding of the communications data, the lens controller 24 judges an on condition of the switch 1 and an on condition of the switch 2 of the camera 1 side and the set value of the shutter speed, and also judges the type of camera.

The image blur correcting interruption processing is a timer interruption that is generated every fixed cycle, wherein control in the pitch direction (longitudinal direction) of the image blur correcting lens 26 (linear motor 32) and image blur correcting control in the yaw direction (lateral direction) are carried out.

Figure 5:
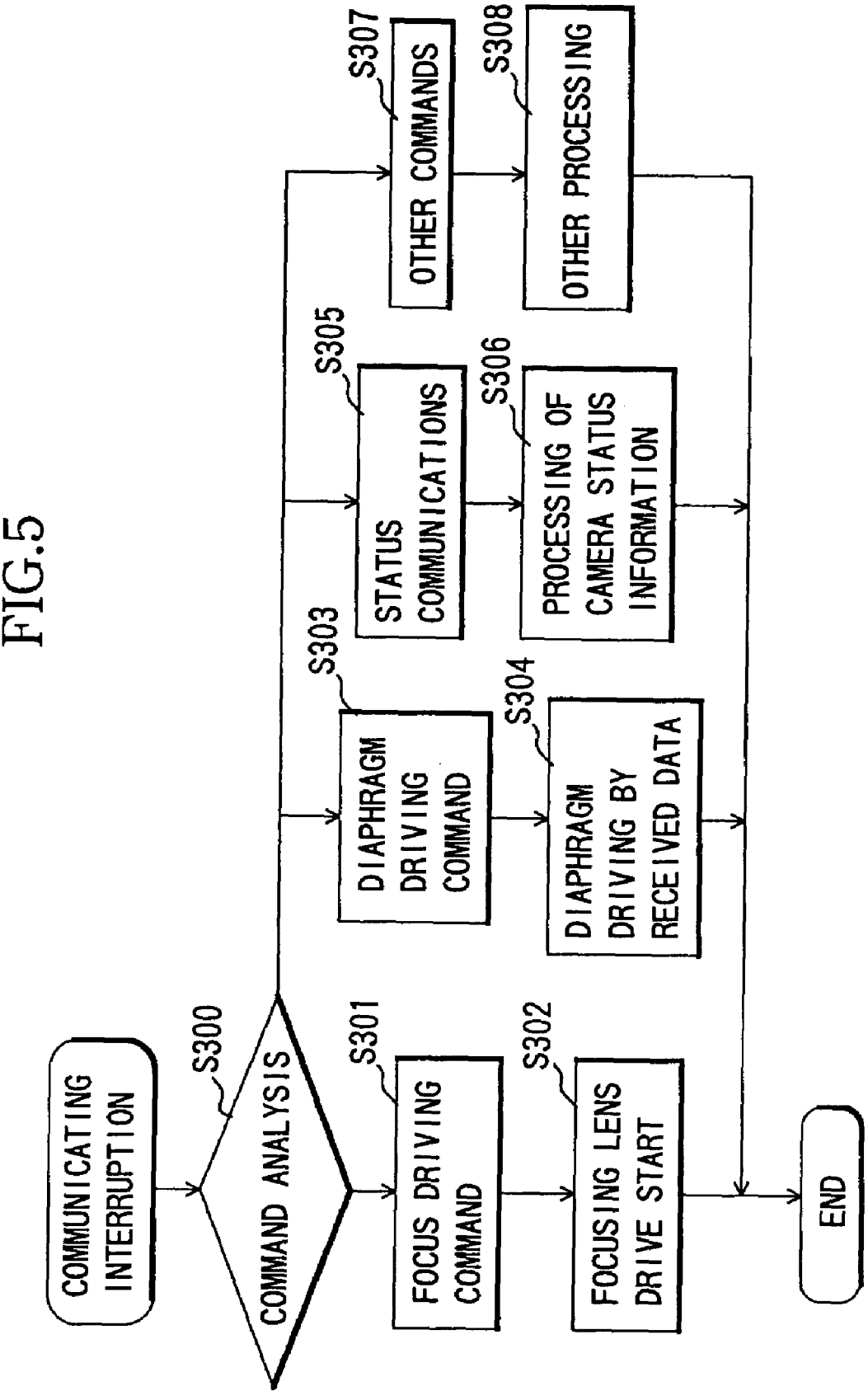
FIG. 5 is a flowchart showing operations of the interchangeable lens side of Embodiment 1.

First, serial communicating interruption processing is described with reference to the flowchart of FIG. 5. The lens controller 24 starts its operation from Step 300 when receiving communications from the camera 1.

In Step 300, the lens controller 24 carries out analysis of commands from the camera 1, and branches to processings corresponding to each command.

In Step 301 and Step 302, when a focus driving command is received in Step 300, the lens controller 24 sets the speed of the focusing lens driving motor 29 in accordance with the target driving pulse number transmitted from the camera 1, and starts focusing lens drive.

In Step 303 and Step 304, when a diaphragm driving command is received in Step 300, the lens controller 24 sets a drive pattern of the diaphragm driving stepping motor 34 based on the transmitted diaphragm drive data, and outputs the set drive pattern to the stepping motor 34 via the diaphragm drive circuit 33 to drive the diaphragm 27.

In Step 305 and Step 306, when a status communications command is received in Step 300, the lens controller 24 stores information about the status transmitted through communications from the camera 1 (the release switch status, image-taking mode, and shutter speed, etc.) in an internal memory (not shown).

In Step 307 and Step 308, when another command such as a command for lens focusing sensitivity data communications or lens optical data communications is received in Step 300, the lens controller 24 executes the corresponding processing.

Next, the image blur correcting interruption processing is described with reference to the flowchart of FIG. 6. When an image blur correcting interruption is generated during main operation of the lens controller 24, the lens controller 24 starts image blur correcting control from Step 400 of FIG. 6.

In Step 400, the lens controller 24 converts a shake signal (angular velocity signal) from the shake sensor 30 into a digital signal by an A/D converter (not shown) provided inside.

In Step 401, the lens controller 24 judges the status of an image blur correction start flag IS_START. This image blur correction start flag IS_START is set in accordance with the status of the IS function ON/OFF switch and the camera status is Step 207 of FIG. 4. When IS_START=1, the process progresses to Step 403, and when IS_START=0, the process progresses to Step 402.

In Step 402, the lens controller 24 does not carry out image blur correction, so that it executes an initialization of a high-pass filter operation and an integration operation.

In Step 403, the lens controller 24 executes a high-pass filter operation for the shake signal in order to carry out the image blur correcting operation. Furthermore, two or three seconds after the start of the image blur correcting operation, time constant switching is carried out, and reduction in image vibration at the build-up point of the image blur correcting operation is also carried out.

In Step 404, the lens controller 24 executes an integration operation for the shake signal that has been subjected to the high-pass filter operation. The result of this operation becomes angular displacement data θ. Furthermore, the cut-off frequency of the integration is also switched in accordance with the shake angular displacement so that image blur correcting operation is not carried out in a case where the camera is panned by a camera operator.

In Step 405, since the amount of eccentricity (sensitivity) of the image blur correcting lens 26 with respect to the shake angular displacement changes in accordance with the position of the zoom lens or the position of the focusing lens 25, the lens controller 24 adjusts the amount of eccentricity. Concretely, the positions of the zoom lens and the focusing lens 25 are divided into several zones, respectively, and an average optical vibration isolation sensitivity (deg/mm) in each zone is readout from table data that has been stored in advance in an unillustrated EEPROM, etc., and converted into drive data of the image blur correcting lens 26. The result of this operation is stored in an unillustrated RAM region set by SFTDRV inside the lens controller 24.

In Step 406, the lens controller 24 converts a displacement signal from a correcting lens position sensor (not shown) which detects the position of the image blur correcting lens 26 from analog to digital, and the result of this conversion is stored in a RAM region set by SFTPST inside the lens controller 24.

In Step 407, the lens controller 24 executes a feedback operation (SFTDRV-SFTPST), and stores the result of the operation in a RAM region set by SFT_DT inside the lens controller 24.

In Step 408, the lens controller 24 multiplies a loop gain LPG_DT and the operation result SFT_DT obtained in Step 407. Then, the result of this operation is stored in a RAM region set by SFT_PWM inside the lens controller 24.

In Step 409, the lens controller 24 executes a phase compensation operation to stabilize the image blur correction control system.

In Step 410, the lens controller 24 outputs the result of operation obtained in Step 409 to the port of the lens controller 24 as a PWM signal (a drive signal). The PWM signal is inputted into a driver circuit inside the IS drive circuit 31, and the driver circuit actuates a linear motor 32 to drive the image blur correcting lens 26. Thereby, image blur correction is carried out. Then, the image blur correcting interruption processing ends.

As mentioned above, in this embodiment, in a case where the luminance difference between the luminance of a main object and the maximum luminance of other areas (bright region), calculated in Steps 107 through 116 of FIG. 2, is equal to or lower than a predetermined luminance (that is, for example, in a case where the main object is a person and the luminance difference between the main object and the surroundings is small as in the case where the surroundings are indoors), and the process is in the middle of the image blur correcting operation, by lowering the sensitivity (gain value G) of the image-pickup device to be lower than the default value and setting the shutter speed to be accordingly low, the image-taking light amount to be made incident onto the image-pickup device 12 from the object can be increased without saturation of the image signals of the bright region (that is, either the main object or the surroundings are prevented from being over exposure), and without image blur. Therefore, affects of noise at the image-taking portion can be suppressed, and an excellent image can be obtained.

Furthermore, in this embodiment, a case is described where the luminance difference between the luminance of a main object and the maximum luminance of other areas (bright region) is equal to or lower than a predetermined luminance, however, if it is known in advance that an object has a luminance the difference of which from other areas is small, or slight signal saturation at the bright region may be ignored, such a condition of the luminance difference may not be set. That is, the sensitivity of the image-pickup device and the shutter speed may be changed in accordance with only the on/off condition of the IS function.

Embodiment 2

In the abovementioned Embodiment 1, a case where the sensitivity of the image-pickup device and the shutter speed are changed in accordance with the on/off condition of the IS function and the luminance difference between the luminance of a main object and the maximum luminance of other areas is described, however, the sensitivity of the image-pickup device and the shutter speed may be changed further in accordance with a detected amplitude of shake.

The structure of a camera system to which this embodiment is applied is the same as that of Embodiment 1, and common components are attached with the same symbols as those in Embodiment 1 and description thereof is omitted.

Figure 7:
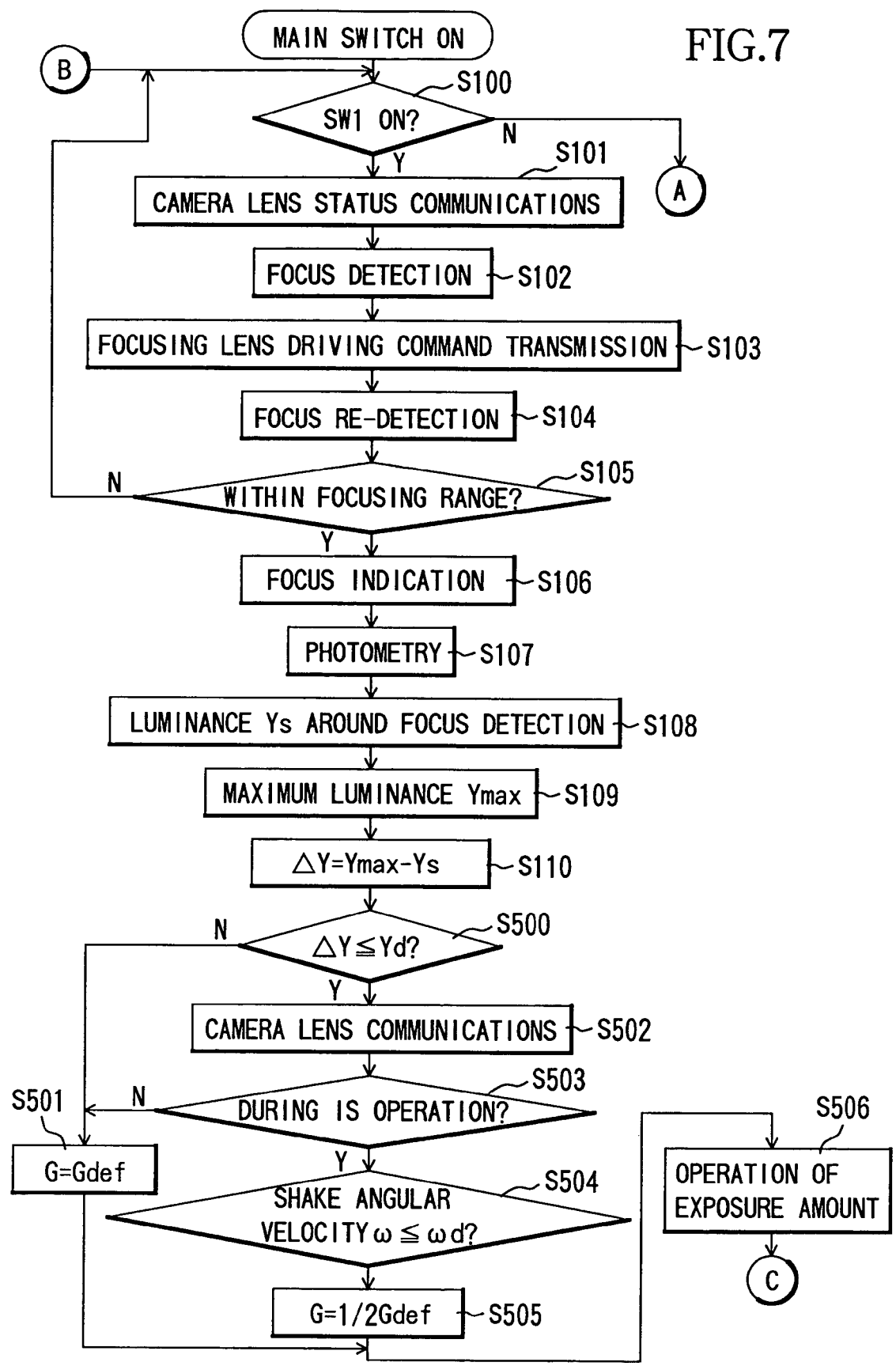
FIG. 7 is a flowchart showing operations of the camera side of Embodiment 2.

With reference to the flowchart of FIG. 7, operations of the camera 1 side in this embodiment are described. In FIG. 7, portions with circled alphabetic letters of FIG. 7 are related to portions with the same circled alphabetic letters of FIG. 3. Furthermore, herein, Steps 500 through 506 that are main operations are described, and other operations are the same as in Embodiment 1 and description thereof is omitted.

In Step 500, the camera controller 7 calculates the difference ΔY between the maximum luminance Ymax and the luminance Ys of an main object through the same processing as in Steps 108 through 110 of Embodiment 1. Then, it is judged as to whether or not the luminance difference ΔY is a predetermined luminance difference Yd or less. If it is the predetermined luminance difference Yd or less, the process progresses to Step 502, and if it is greater than the predetermined luminance Yd, the process progresses to Step 501.

In Step 501, the camera controller 7 sets the gain value G of the gain control circuit 15 to the default value Gdef.

In Step 502, the camera controller 7 carries out communications with the interchangeable lens 2. Herein, status communications for confirming the on/off condition of the IS function inside the interchangeable lens 2 and lens shake communications for receiving shake angular velocity signal data detected by the shake sensor 30 inside the interchangeable lens 2 are carried out.

In Step 503, the camera controller 7 judges whether or not the IS function of the interchangeable lens 2 is on based on the result of status communications carried out in Step 502. If it is on, the process progresses to Step 504, and if it is off, the process progresses to Step 501.

In Step 504, the camera controller 7 judges whether or not the shake angular velocity ω indicating the amplitude of the shake is at a predetermined value ωd or less. If the shake angular velocity ω is greater than the predetermined value ωd, it is considered that the camera is in the middle of panning, the process progresses to Step 501 since a sufficient image blur correcting effect cannot be obtained, and the same gain value as in the case where the IS is off is set. On the other hand, the shake angular velocity ω is at the predetermined value o)d or less, the process progresses to Step 505 for effective image blur correction.

In Step 505, the camera controller 7 sets the gain value G of the gain control circuit 15 to ½ of the default value Gdef.

In Step 506, the camera controller 7 operates an exposure amount based on a photometry result. Herein, the f-number and the shutter speed are determined based on the photometry result and the gain value G. When the gain value G is set to be small (½ of Gdef) in Step 505, the shutter speed is set to be accordingly low. Furthermore, when the shutter speed is lower than a predetermined speed, light emission may be obtained by using a strobe or the gain value G may be increased.

Figure 6:
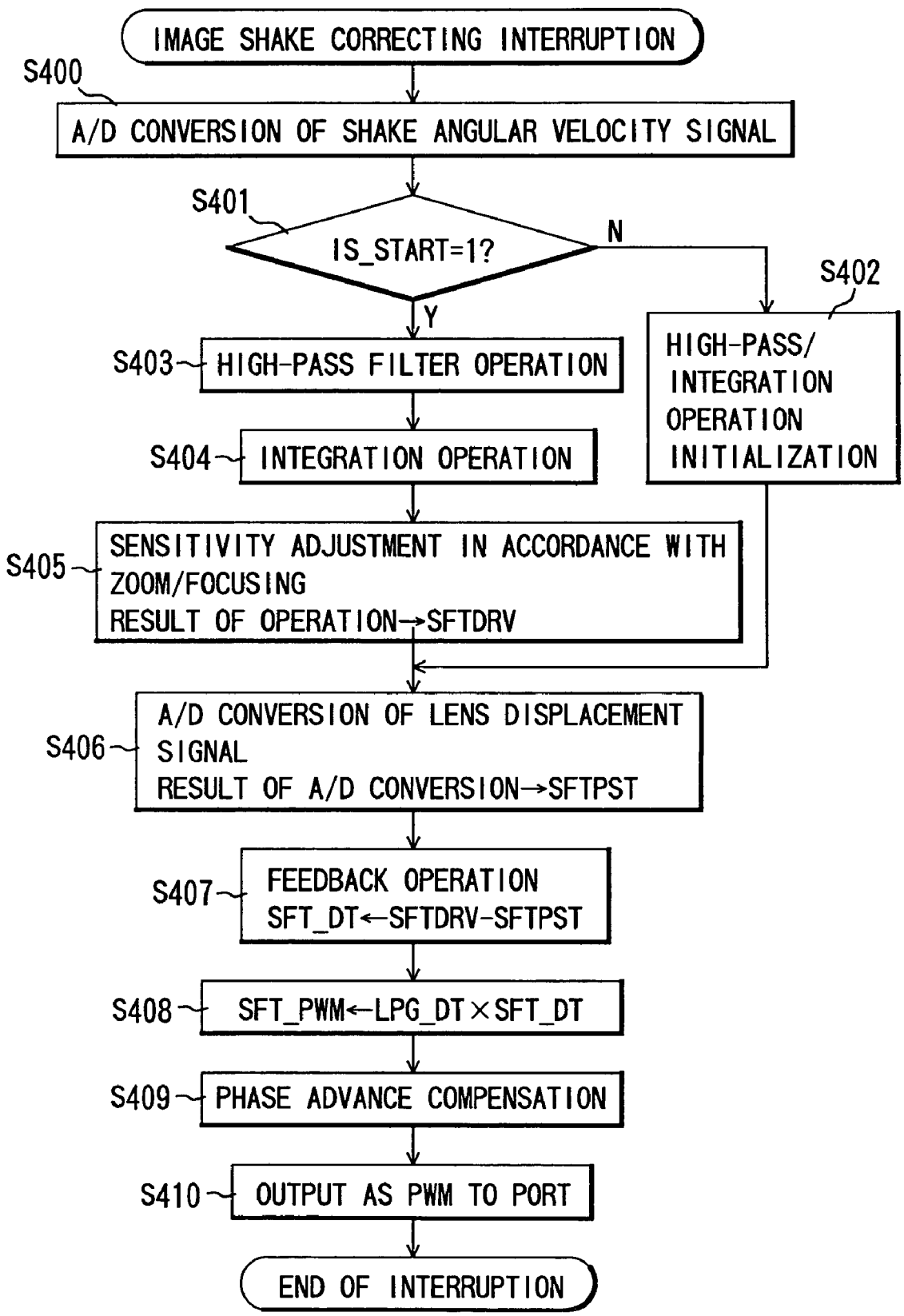
FIG. 6 is a flowchart showing operations of the interchangeable lens side of Embodiment 1.

On the other hand, at the interchangeable lens 2 side, as shown in Step 400 of FIG. 6 of Embodiment 1, the lens controller 24 converts the shake signal (angular velocity signal) from the shake sensor 30 into a digital signal by an A/D converter (not shown) provided inside, and the result of this conversion is transmitted as shake angular velocity data (o to the camera 1 side by means of shake data communications of camera-lens communications.

As described above, according to this embodiment, in a case where the luminance difference between the luminance of the main object and the maximum luminance of other areas (bright region) is the predetermined luminance or less, image blur correction is executed, and the amplitude of the shake is equal to or less than a predetermined value at which a sufficient image blur correcting effect can be expected, the sensitivity of the image-pickup device is lowered and the shutter speed is set to be accordingly lower. Namely, even when image blur correction is executed, if the camera is being panned or the shake is so great that the image blur correcting effect cannot be expected, the sensitivity of the image-pickup device, etc., is not changed. Thereby, the image-taking light amount to be made incident on the image-pickup device from the object can be increased without saturation of image signals at the bright region and without image blur. Therefore, affects of noise at the image-taking part can be suppressed, and an excellent image can be obtained.

In this embodiment, a case is described where the luminance difference between the luminance of the main object and the maximum luminance of other areas (bright region) is equal to or lower than a predetermined luminance, however, if it is known in advance that an object has a luminance the difference of which from other areas may be small, or slight signal saturation at the bright region is ignored, such a condition of the luminance difference may not be set. Namely, the sensitivity of the image-pickup device and the shutter speed may be changed depending on only the on/off condition of the IS function and the amplitude of the shake.

Furthermore, the data showing the amplitude of the shake to be transmitted from the interchangeable lens 2 to the camera 1 is not limited to angular velocity data, but may be data showing the shake amount which indicates the angular displacement, angular acceleration, or shift displacement.

The operation of Step 504 of FIG. 7, that is, the operation of judgement as to whether or not the amplitude of the shake is at a predetermined value or less may be carried out by the lens controller 24 of the interchangeable lens 2 side. In this case, information of a flag indicating whether or not the shake is at a predetermined value or less is transmitted from the interchangeable lens 2 to the camera 1.

Furthermore, in this embodiment, two cases where the amplitude of shake is equal to or less than a predetermined value and the amplitude of shake is greater than the predetermined value are divided, however, division into three or more cases is also possible.

Embodiment 3

In the abovementioned Embodiment 1, a case where the sensitivity of the image-pickup device and the shutter speed are changed in accordance with the on/off condition of the IS function and the luminance difference between the luminance of the main object and the maximum luminance of other areas is described, however, it is also possible that the sensitivity of the image-pickup device and the shutter speed are changed in accordance with the image-taking mode.

The structure of a camera system to which this embodiment is applied is the same as that of Embodiment 1, and common components are attached with the same symbols as those in Embodiment 1 and description thereof is omitted.

Figure 8:
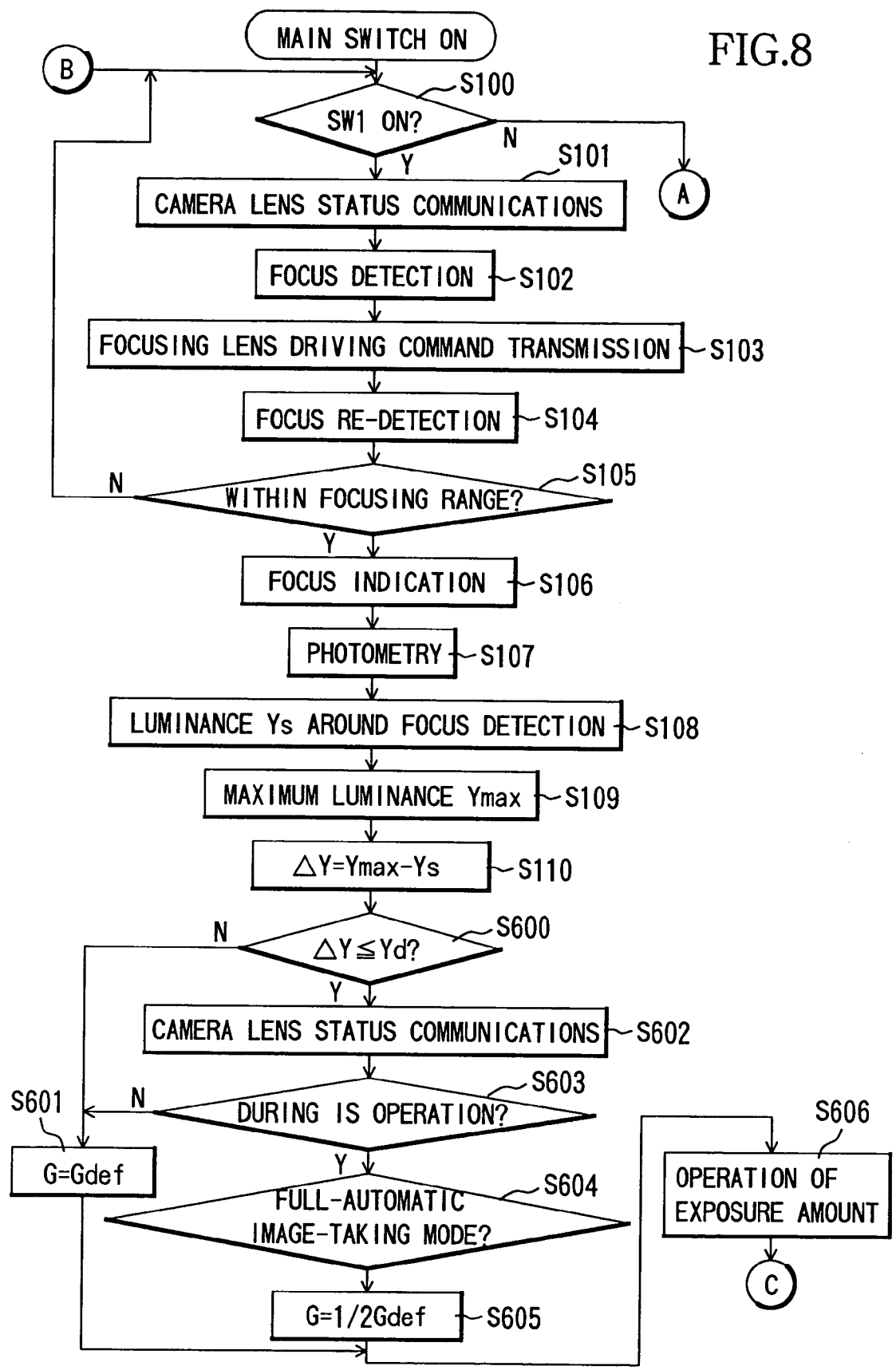
FIG. 8 is a flowchart showing operations of the camera side of Embodiment 3.
Figure 9:
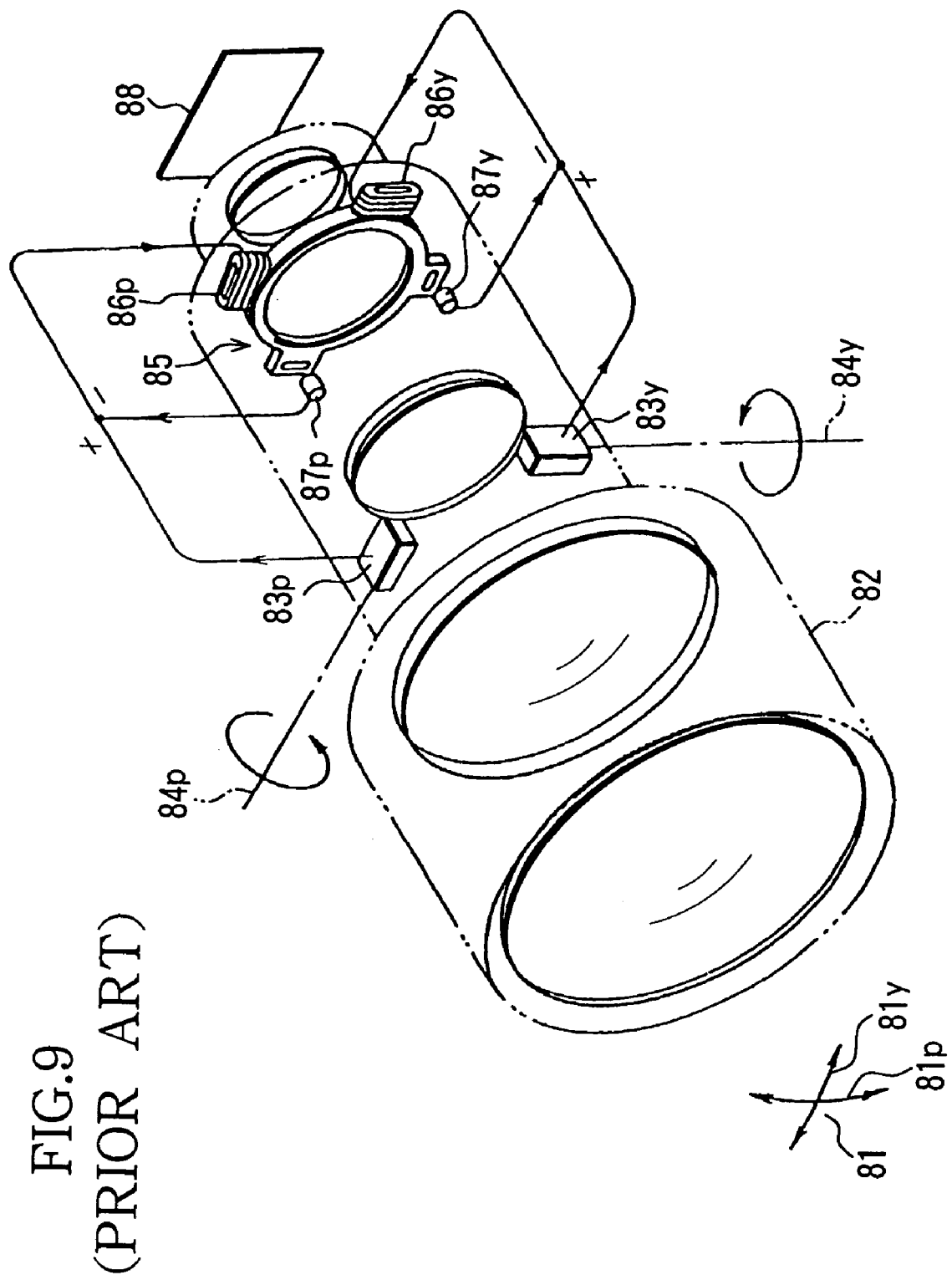
FIG. 9 is a block diagram showing an example of a conventional image blur correcting system.

With reference to the flowchart of FIG. 8, operations of the camera 1 side of this embodiment are described. In FIG. 8, portions with circled alphabetic letters are related to portions with the same circled alphabetic letters of FIG. 3. Herein, Steps 600 through 606 that are main operations are described, and other operations are the same as in Embodiment 1 and description thereof is In Step 600, the camera controller 7 calculates the difference ΔY between the maximum luminance Ymax and the luminance Ys of the main object through the same processings as those of Steps 108 through 110 of Embodiment 1. Then, it is judged as to whether or not the luminance difference ΔY is the predetermined luminance difference Yd or less. If it is the predetermined luminance difference Yd or less, the process progresses to Step 602, and if it is greater than the predetermined luminance difference Yd, the process progresses to Step 601.

In Step 601, the camera controller 7 sets the gain value G of the gain control circuit 15 to the default value Gdef.

In Step 602, the camera controller 7 carries out status communications with the interchangeable lens 2. Herein, the on/off condition of the IS function of the interchangeable lens 2 is checked.

In Step 603, the camera controller 7 judges whether or not the IS function of the interchangeable lens 2 is on based on the result of status communications in Step 602. If it is on, the process progresses to Step 604, and if it is off, the process progresses to Step 601.

In Step 604, the camera controller 7 judges whether or not an image-taking mode setting 21a included in the operation part 21 of the camera 1 is set to a full-automatic image-taking mode. The full-automatic mode is a mode in which the shutter speed, charge storage time, and f-number are automatically set following a predetermined program based on the photometry result. If the mode is not the full-automatic image-taking mode, the process progresses to Step 601, and if it is the full-automatic image-taking mode, the process progresses to Step 605.

In Step 605, the camera controller 7 sets the gain value G of the gain control circuit 15 to ½ of the default value Gdef.

In Step 606, the camera controller 7 operates an exposure amount based on the photometry result. Herein, the f-number and the shutter speed are determined based on the photometry result and the gain value G. When the gain value G is set to be small (½ of Gdef) in Step 605, the shutter speed is determined to be accordingly low. In a case where the shutter speed is lower than a predetermined speed, light emission may be obtained by using a strobe or the gain value G may be increased.

On the other hand, operations of the interchangeable lens 2 side are the same as in Embodiment 1.

As described above, in Steps 600 through 606 of FIG. 8 in this embodiment, in a case where the luminance difference between the luminance of a main object and the maximum luminance of other areas (bright region) is equal to or lower than a predetermined luminance, image blur correction is executed, and the full-automatic image-taking mode is selected, by lowering the sensitivity of the image-pickup device and setting the shutter speed to be accordingly lower, the image-taking light amount to be made incident on the image-pickup device from the object can be increased without saturation of image signals at the bright region and without image blur. Therefore, affects of noise at the image-taking part can be suppressed, and an excellent image can be obtained.

In this embodiment, a case is described where the luminance difference between the luminance of a main object and the maximum luminance of other areas (bright region) is equal to or less than a predetermined luminance, however, if it is known in advance that an object has a luminance the difference of which from other areas is small, or slight signal saturation at the bright region may be ignored, such a condition of the luminance difference may not be set. That is, the sensitivity of the image-pickup device and the shutter speed may be changed in accordance with only the on/off condition of the IS function.

In addition, when the image-taking mode is set to a sports image-taking mode or a shutter-speed priority mode, the shutter speed is set to be high in order to take an image of a quickly moving object, or a camera operator sets a desired shutter speed, so that the abovementioned changes in the sensitivity of the image-pickup device and the shutter speed are not necessary.

Furthermore, in each of the abovementioned embodiments, the case of a camera system of an interchangeable lens type is shown, however, the present invention can also be applied to a digital still camera in which a camera and a lens apparatus are integrated. In this case, the functions of the lens microcomputer (excluding the communications function) of the abovementioned embodiments are added to a camera microcomputer.

Furthermore, in each of the abovementioned embodiments, the case where the shake sensor 30 (and the IS drive circuit 31) is provided at the interchangeable lens side is described, however, it may be provided at the camera side.

Furthermore, in each of the abovementioned embodiments, the case where the camera is provided with the quick-return mirror 3 and the shutter 10 is described, however, a structure in which these are not provided and an image-taking light flux from an object is always made incident on the image-pickup device may be employed. In this case, the exposure time of the image-pickup device is changed by changing the charge storage time at the image-pickup device.

In the abovementioned embodiments, the structure is formed so that object light is made incident on the focus detection unit 9 via the sub-mirror 8, however, any structure may be employed as long as it can detect the focusing status of the image-taking optical system. It is also possible that a line sensor is set on the image-pickup device 12 and the focusing status of the image-taking optical system is detected based on signals from the line sensor.

In the abovementioned embodiments, the photometric circuit 6 is installed near the optical finder 5, however, the image-pickup device 12 may be formed so as to commonly serve as the photometric circuit.

Furthermore, in the abovementioned embodiments, the gain value is changed to ½ of the default value, however, it may be changed to any value as long as it is lower than a gain value in a case where image blur correction is not executed.

The invention can also be applied to a video camera with a still image taking function.

While preferred embodiments have been described, it is to be understood that modification and variation of the present invention may be made without departing from the scope of the following claims.

What is claimed is:

1. A camera which takes images through an image-taking optical system including a shake correction unit which drives a part of the image-taking optical system to correct image blur caused by camera shake, comprising:
    an image-pickup device which converts an optical image of an object formed by the image-taking optical system into image signal;
    a control circuit which controls operations of the camera; and
    a gain control circuit which amplifies the image signal output from the image-pickup device based on a gain value set by the control circuit,
    wherein the control circuit sets the gain value of the gain control circuit to be lower and an exposure time of the image-pickup device to be longer when the shake correction unit is in operation than when the shake correction unit is not in operation.

2. The camera according to claim 1, further comprising a photometric unit which measures a luminance of the object,
    wherein when the shake correction unit is in operation and a difference between a luminance of a main object obtained from the photometric unit and a luminance of a bright region other than the main object is equal to or lower than a predetermined value, the control circuit sets the gain value of the gain control circuit to be lower and the exposure time of the image-pickup device to be longer than when the shake correction unit is not in operation.

3. The camera according to claim 2, further comprising a determination unit which determines the main object in an image-taking region.

4. A camera system, comprising:
    the camera according to claim 1; and
    a lens apparatus including the shake correction unit and attached to the camera.

* * * * *